US012450486B2

(12) United States Patent
Zappi et al.

(10) Patent No.: US 12,450,486 B2
(45) Date of Patent: Oct. 21, 2025

(54) DEPTH-FIRST DEEP CONVOLUTIONAL NEURAL NETWORK INFERENCE

(71) Applicant: QUALCOMM Incorporated, San Diego, CA (US)

(72) Inventors: Piero Zappi, La Jolla, CA (US); Jin Won Lee, San Diego, CA (US); Christopher Lott, San Diego, CA (US); Rexford Alan Hill, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1133 days.

(21) Appl. No.: 17/121,499

(22) Filed: Dec. 14, 2020

(65) Prior Publication Data

US 2021/0182684 A1 Jun. 17, 2021

Related U.S. Application Data

(60) Provisional application No. 62/948,113, filed on Dec. 13, 2019.

(51) Int. Cl.
*G06N 3/082* (2023.01)
*G06F 9/48* (2006.01)
*G06F 9/50* (2006.01)
*G06N 3/04* (2023.01)
*G06N 3/045* (2023.01)
*G06N 3/10* (2006.01)

(52) U.S. Cl.
CPC ......... *G06N 3/082* (2013.01); *G06F 9/4881* (2013.01); *G06N 3/04* (2013.01); *G06F 9/5066* (2013.01); *G06F 2209/485* (2013.01)

(58) Field of Classification Search
None
See application file for complete search history.

(56) References Cited

U.S. PATENT DOCUMENTS

| 11,640,522 B2 * | 5/2023 | Shattil ................. G06N 3/063 706/41 |
| 2017/0344486 A1 * | 11/2017 | Jung ................. G06F 12/0868 |
| 2018/0164866 A1 * | 6/2018 | Turakhia ............. G06N 3/063 |
| 2018/0189056 A1 * | 7/2018 | Turakhia ............ G06F 9/3001 |
| 2019/0220734 A1 * | 7/2019 | Ferdman ............... G06F 17/15 |

(Continued)

OTHER PUBLICATIONS

Manoj et al., "Fused-Layer CNN Accelerators", IEEE, total pp. 12, date: 2016 (Year: 2016).*

(Continued)

*Primary Examiner* — Mustafa A Amin
(74) *Attorney, Agent, or Firm* — Seyfarth Shaw LLP

(57) ABSTRACT

A method performed by a computing device includes determining a partition for depth-first processing by a multi-layer artificial neural network (ANN) of the computing device. The computing device comprising a processor, on-chip memory, and off-chip memory. The first partition determined based on an amount of on-chip memory used by the first partition, an available amount of on-chip memory, and a size of a write back to the off-chip memory. The method also includes processing, at the device via the multi-layer ANN, an input, using the depth-first processing in accordance with the partition.

26 Claims, 14 Drawing Sheets

(56) References Cited

U.S. PATENT DOCUMENTS

2019/0244091 A1* 8/2019 Weber .................. G06N 3/08

OTHER PUBLICATIONS

Xavier et al., "Memory usage and computational considerations", NPL, dated: Jul. 2016; pp. 1-25; retrieved from URL:<https://imatge-upc.github.io/telecombcn-2016-dlcv/slides/D2L1-memory.pdf>, (Year: 2016).*

Binas et al., "Low-memory convolutional neural networks through incremental depth-first processing", NPL, dated: May 20, 2019; pp. 1-9, retrieved from URL:<https://arxiv.org/pdf/1804.10727>. (Year: 2019).*

\* cited by examiner

DEPTH-FIRST DEEP CONVOLUTIONAL NEURAL NETWORK INFERENCE

CROSS-REFERENCE TO RELATED APPLICATION

The present application claims the benefit of U.S. Provisional Patent Application No. 62/948,113, filed on Dec. 13, 2019, and titled "DEPTH-FIRST DEEP CONVOLUTIONAL NEURAL NETWORK INFERENCE," the disclosure of which is expressly incorporated by reference herein in its entirety.

BACKGROUND

Field

Aspects of the present disclosure generally relate to artificial neural networks, such as deep convolutional neural networks.

Background

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field.

Deep convolutional neural networks (DCNs) are used in various technologies, such as image recognition, speech recognition, autonomous driving, and Internet of Things (IoT) devices. Resources, such as limited on-chip memory, may be constrained in embedded IoT devices. As such, the use of DCNs on these devices may be constrained. It is desirable to improve the use of DCNs on devices with limited resources.

SUMMARY

In one aspect of the present disclosure, method performed by a computing device is presented. The computing device may include a processor, on-chip memory, and off-chip memory. The method includes determining a first partition for depth-first processing by a multi-layer artificial neural network (ANN) of the computing device. The first partition may be determined based on an amount of on-chip memory used by the first partition, an available amount of on-chip memory, and a size of a write back to the off-chip memory. The method further includes processing, via the multi-layer ANN, an input, using the depth-first processing in accordance with the first partition.

Another aspect of the present disclosure is directed to an apparatus of a computing device including a processor, on-chip memory, and off-chip memory. The apparatus includes means for determining a first partition for depth-first processing by a multi-layer ANN of the computing device. The first partition may be determined based on an amount of on-chip memory used by the first partition, an available amount of on-chip memory, and a size of a write back to the off-chip memory. The apparatus further includes means for processing, via the multi-layer ANN, an input, using the depth-first processing in accordance with the first partition.

In another aspect of the present disclosure, non-transitory computer-readable medium having program code recorded thereon for a computing device comprising a processor, on-chip memory, and off-chip memory is disclosed. The program code is executed by the processor and includes program code to determine a first partition for depth-first processing by a multi-layer ANN of the computing device. The first partition may be determined based on an amount of on-chip memory used by the first partition, an available amount of on-chip memory, and a size of a write back to the off-chip memory. The program code also includes program code to process, via the multi-layer ANN, an input, using the depth-first processing in accordance with the first partition.

Another aspect of the present disclosure is directed to an apparatus having a processor comprising on-chip memory, off-chip memory coupled with the processor, and instructions stored in the off-chip memory and the on-chip memory. The instructions operable, when executed by the processor, to cause the apparatus to determine a first partition for depth-first processing by a multi-layer ANN of the apparatus. The first partition may be determined based on an amount of on-chip memory used by the first partition, an available amount of on-chip memory, and a size of a write back to the off-chip memory. The instructions are also operable to cause the apparatus process, via the multi-layer ANN, an input, using the depth-first processing in accordance with the first partition.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
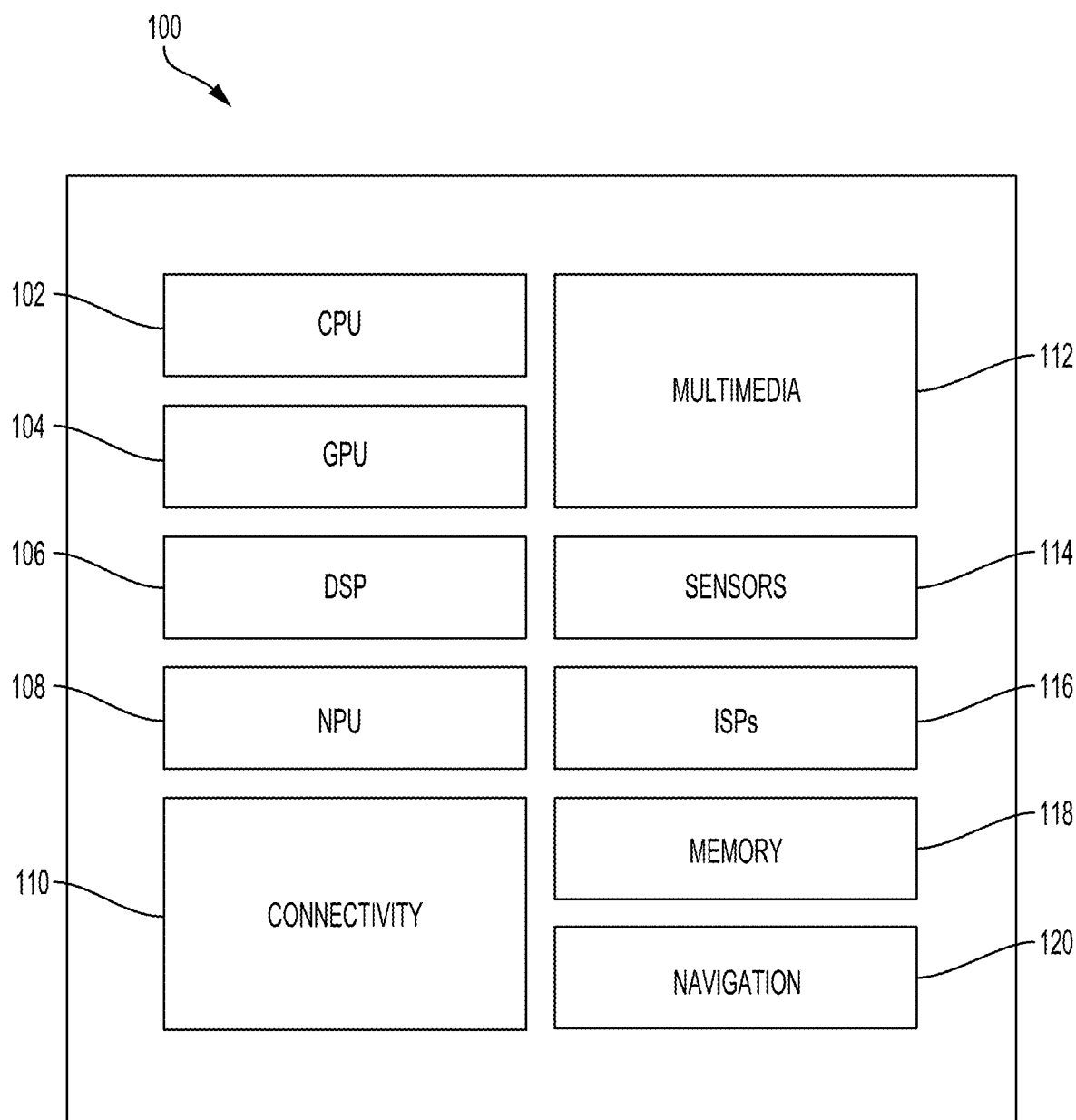
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Emerging technologies, such as Internet of things (IoT) devices, implement deep neural networks on edge devices, such as mobile devices and wearable devices. Edge devices may have limited storage, memory, and/or processing capabilities.

In most cases, deep convolutional networks (DCNs) process large amounts of data, such as model weights and activations. Functions of the DCN on an embedded processor and dedicated accelerators (e.g., neural processing units (NPUs)) may be bounded by an amount of available memory. Access to off-chip memory (e.g., dynamic random-access memory (DRAM)) may increase latency and/or the use of energy.

Conventional solutions store activations in off-chip memory, thereby limiting a DCN's performance. Limiting off-chip memory access improves DCN performance and allows for the deployment of more complex networks on devices with limited resources. Aspects of the present disclosure are directed to improving network partitions and reducing off-chip memory access.

FIG. 1 illustrates an example implementation of a system-on-a-chip (SOC) 100, which may include a central processing unit (CPU) 102 or a multi-core CPU configured for identifying network partitions to reduce off-chip memory access, in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may comprise code to determine a first partition for depth-first processing by a multi-layer artificial neural network (ANN). Each partition, such as the first partition, may be determined based on an amount of on-chip memory used by the partition, an available amount of on-chip memory, and a size of a write back to the off-chip memory. The general-purpose processor 102 may also comprise code to process, via the multi-layer ANN, an input, using the depth-first processing in accordance with the first partition.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
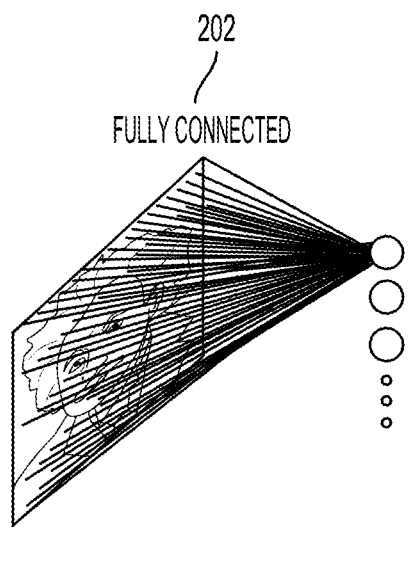
FIGS. 2A, 2B, and 2C are diagrams illustrating a neural network in accordance with aspects of the present disclosure.
Figure 2B:
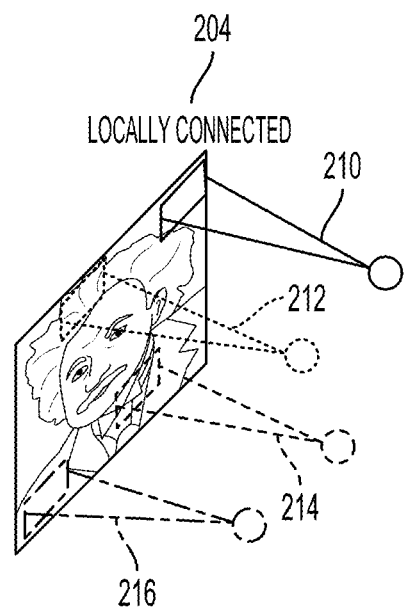

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
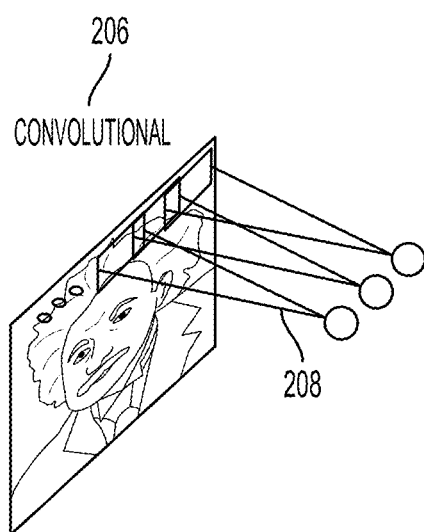

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
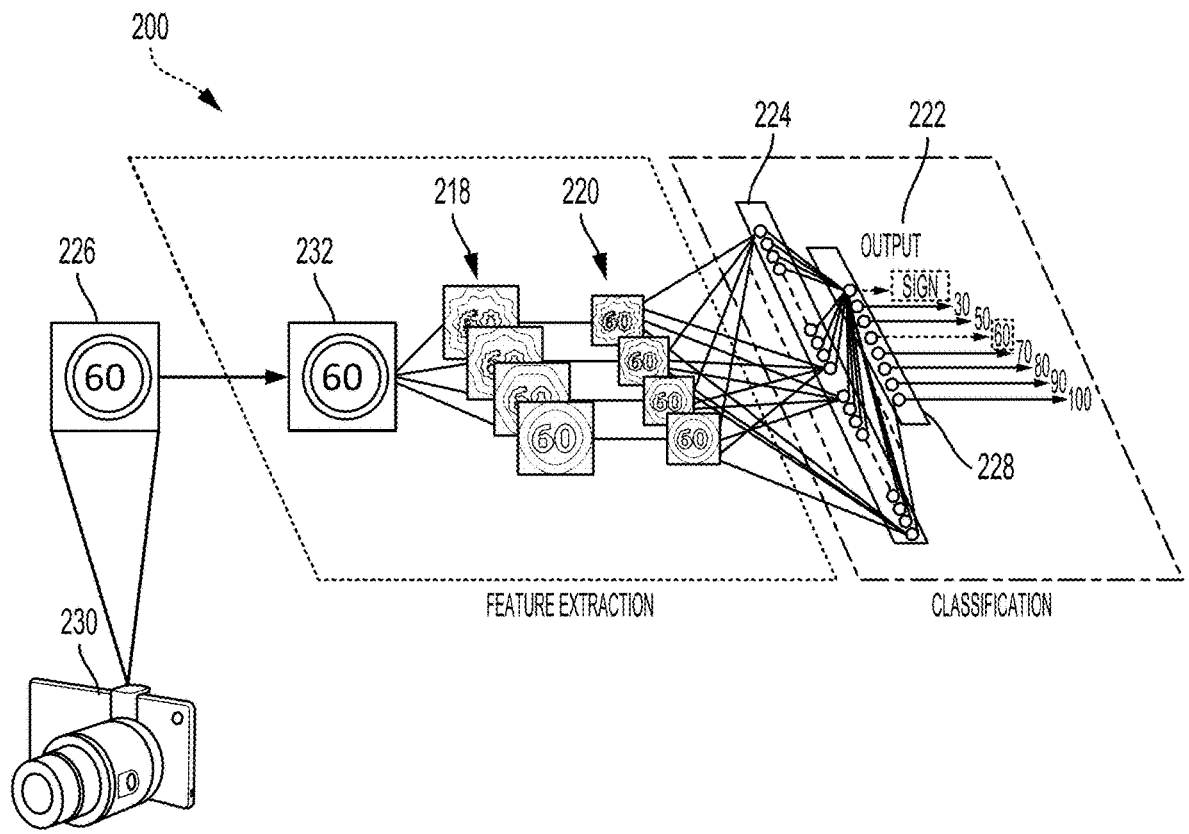
FIG. 2D is a diagram illustrating an exemplary deep convolutional network (DCN) in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown)

may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 226) and a forward pass through the network may yield an output 222 that may be considered an inference or a prediction of the DCN.

Deep belief networks (DBNs) are probabilistic models comprising multiple layers of hidden nodes. DBNs may extract a hierarchical representation of training data sets. A DBN may be obtained by stacking up layers of Restricted Boltzmann Machines (RBMs). An RBM is an example of one type of artificial neural network that learns a probability distribution over a set of inputs. Because RBMs can learn a probability distribution in the absence of information about the class to which each input should be categorized, RBMs may be specified for unsupervised learning. Using a hybrid unsupervised and supervised paradigm, the bottom RBMs of a DBN may be trained in an unsupervised manner and may serve as feature extractors. Additionally, the top RBM may be trained in a supervised manner and may serve as a classifier. The top RBM may be trained on a joint distribution of inputs from the previous layer and target classes.

Deep convolutional networks (DCNs) are networks of convolutional networks, configured with additional pooling and normalization layers. DCNs may be trained using supervised learning, in which both the input and output targets are known. The weights of the DCN may be modified based on gradient descent methods.

In one example, a DCN may be a feed-forward network. In addition, as described above, the connections from a neuron in a first layer of a DCN to a group of neurons in the next higher layer are shared across the neurons in the first layer. The feed-forward and shared connections of DCNs may be exploited to improve processing speeds. The computational burden of a DCN may be less, for example, than that of a similarly sized neural network comprising recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
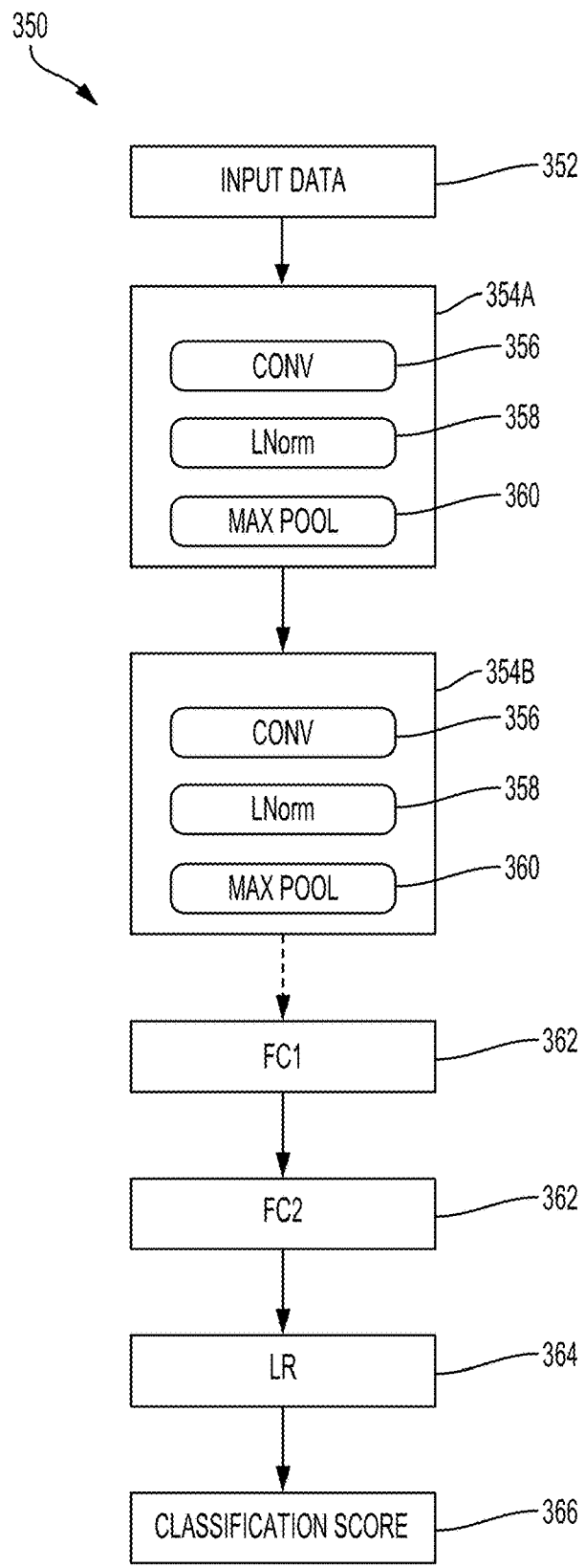
FIG. 3 is a block diagram illustrating an exemplary deep convolutional network (DCN) in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data, including a feature from a set of features.

Figure 4:
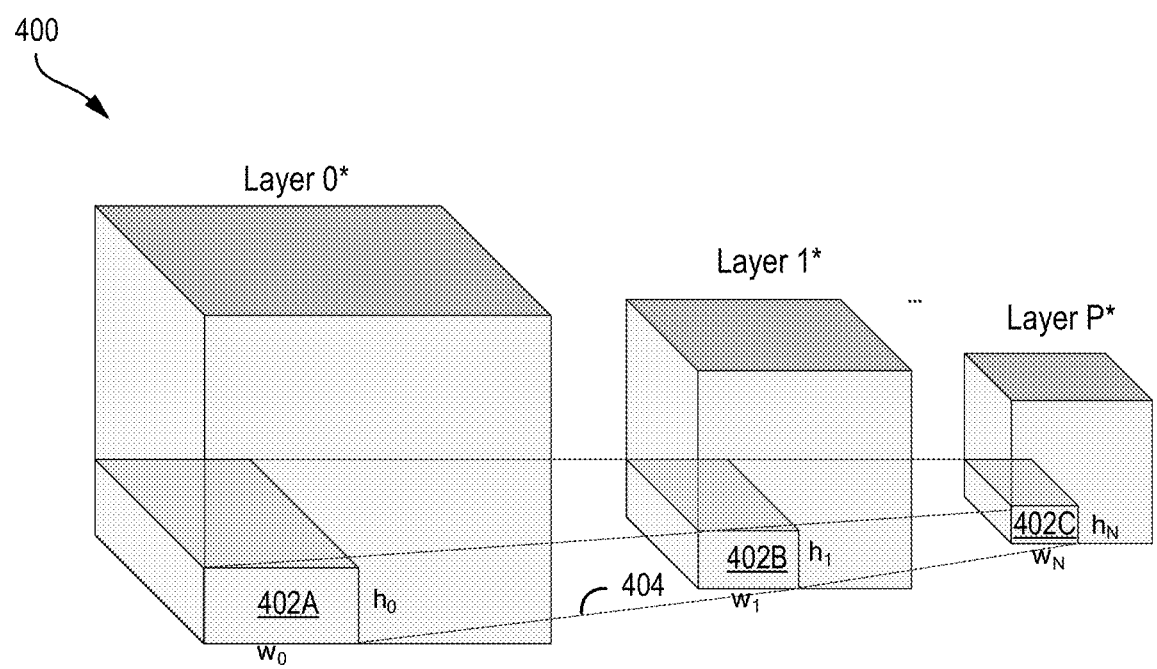
FIG. 4 is a block diagram illustrating an example of depth-first processing for a deep convolutional network (DCN) in accordance with aspects of the present disclosure.

Depth-first processing computes and stores calculations from a layer set to on-chip memory. To reduce off-chip memory access, it may be desirable to improve network partitions. FIG. 4 is a block diagram illustrating an example of depth-first processing for a DCN 400 according to aspects of the present disclosure. In the example of FIG. 4, each layer of the DCN 400 performs local filtering such as, for example, convolution, pooling, or elementwise filtering. Additionally, in the example of FIG. 4, intervening layers (not shown) such as, for example, non-linearity, normalization, and/or pooling layers, may be defined between any two adjoining layers.

The DCN 400 may include multiple layers (0-N). A set of layers (e.g., 0*, 1*, P*) may be partitioned from the multiple layers (0-N), where P* is the last layer before a write back for the given set of layers. The write back refers to an operation for writing the results of the convolutions (e.g., inference) to off-chip memory. That is, a write back operation provides an output of a layer to memory, such as DRAM. In conventional systems, the write back is performed for each layer. In depth-first processing, the write back is performed at the last layer of each layer set.

Conventional methods of processing a DCN layer-by-layer increase read and write operations, and also increase the use of operational memory. In most cases, an amount of on-chip memory is too small to hold an entire layer. Therefore, layers may be processed in segments. For example, a segment may be loaded into the on-chip memory, processed with weights, and then written to the off-chip memory, until the entire layer is processed. Specifically, conventional methods read all the elements of the input vector to the first layer along with the corresponding kernel weights from the off-chip memory (e.g., holding memory). The read elements and kernel weights are stored in the on-chip memory, and all of the elements of a second layer are written to the off-chip memory. The process of reading from and writing to the off-chip memory continues for the remaining layers.

Depth-first processing may enable simultaneous processing of multiple layers based on a size of the on-chip memory (e.g., static random access memory (SRAM)). On-chip memory may also be referred to as operational memory or local memory. The number of layers for processing may be determined based on whether the on-chip memory can support the next layer's receptive fields and kernel. If so, then the next layer is added to a layer set for depth-first processing. If not, the next layer may be assigned to a different layer set for depth-first processing. The values of a last layer of each layer set are written to the off-chip memory. The last layer of a layer set may be referred to as the cut-off layer.

In the example of depth-first processing, multiple cones (e.g., processing cones) may be generated over the set of layers (e.g., 0*, 1*, P*) of a partition. For ease of explanation, FIG. 4 illustrates one cone 404. Each cone processes a different portion of inputs to each layer of the set of layers. In the example of FIG. 4, the cone 404 processes inputs received in the portion 402A, 402B, 402C of each layer. The cone 404 may process the inputs using on-chip memory. As an example, the portion the portion 402A, 402B, 402C of a corresponding layer may have dimensions [h]×[w]×$C_i$×$C_o$ (not shown in FIG. 4). The variable $C_i$ represents a number of channels in the input tensor, and the variable $C_o$ represents a number of channels in the output tensor. The portions 402 of each layer in the cone 404 may be processed before the write back. After processing the portions 402A, 402B, 402C of the cone 404 in the layer set, the network processes a next set of portions (e.g., tiles) of another cone from each layer of the layer set. The process continues until the portions of all cones are processed. The portions 402A, 402B, 402C of the cone 404 may also be referred to as tiles.

Figure 5:
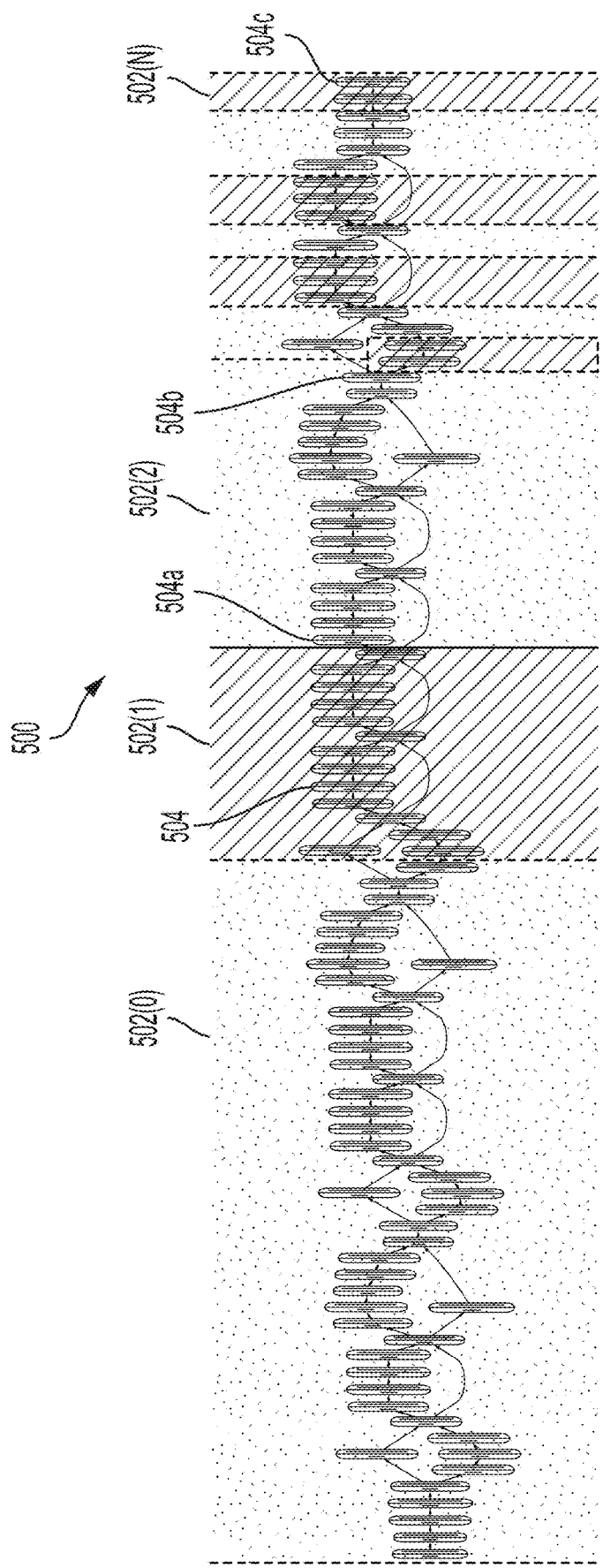
FIG. 5 is a diagram illustrating an example of a deep convolutional network (DCN) partitioned in accordance with aspects of the present disclosure.

Some solutions partition a DCN according to a so called greedy solution (e.g., "greedy algorithm"), or another type of solution. A greedy solution considers a best solution (e.g., partition location) at each step, rather than considering an overall best solution. Aspects of the present disclosure are directed to partitioning the DCN based on dynamic programming. FIG. 5 is a diagram illustrating an example of a DCN 500 partitioned according to aspects of the present disclosure. As shown in FIG. 5, the DCN 500 is partitioned into layer sets 502(0)-502(N). Each layer set 502(0)-502(N) corresponds to a different partition. Furthermore, each layer set 502(0)-502(N) includes a number of layers 504, including a first layer 504a and a last layer 504b. For ease of explanation, in FIG. 5, the first layer 504a and the last layer 504b are identified for one layer set 502(2) of the layer sets 502(0)-502(N).

A number of layers 504 in each partition may be determined by an amount of on-chip memory. For each layer set 502(0)-502(N), output activations and weights of the layers 504 are written to the on-chip memory. That is, the output activations and weights layers 504 of a given layer set 502(0)-502(N) are processed together before the output activations and weights of the last layer 504b of the given layer set 502(0)-502(N) are written to off-chip memory. In one configuration, the dynamic programming process determines the network partitions by starting at a final layer 504c of a final layer set 502(N) of the DCN 500. The final layer 504c is the last layer before a write back of an output of the entire DCN. As described above, each layer set 502(0)-502(N) includes a first layer 504a and a last layer 504b. The final layer 504c is the last layer of the final layer set 502(N).

Figure 6A:
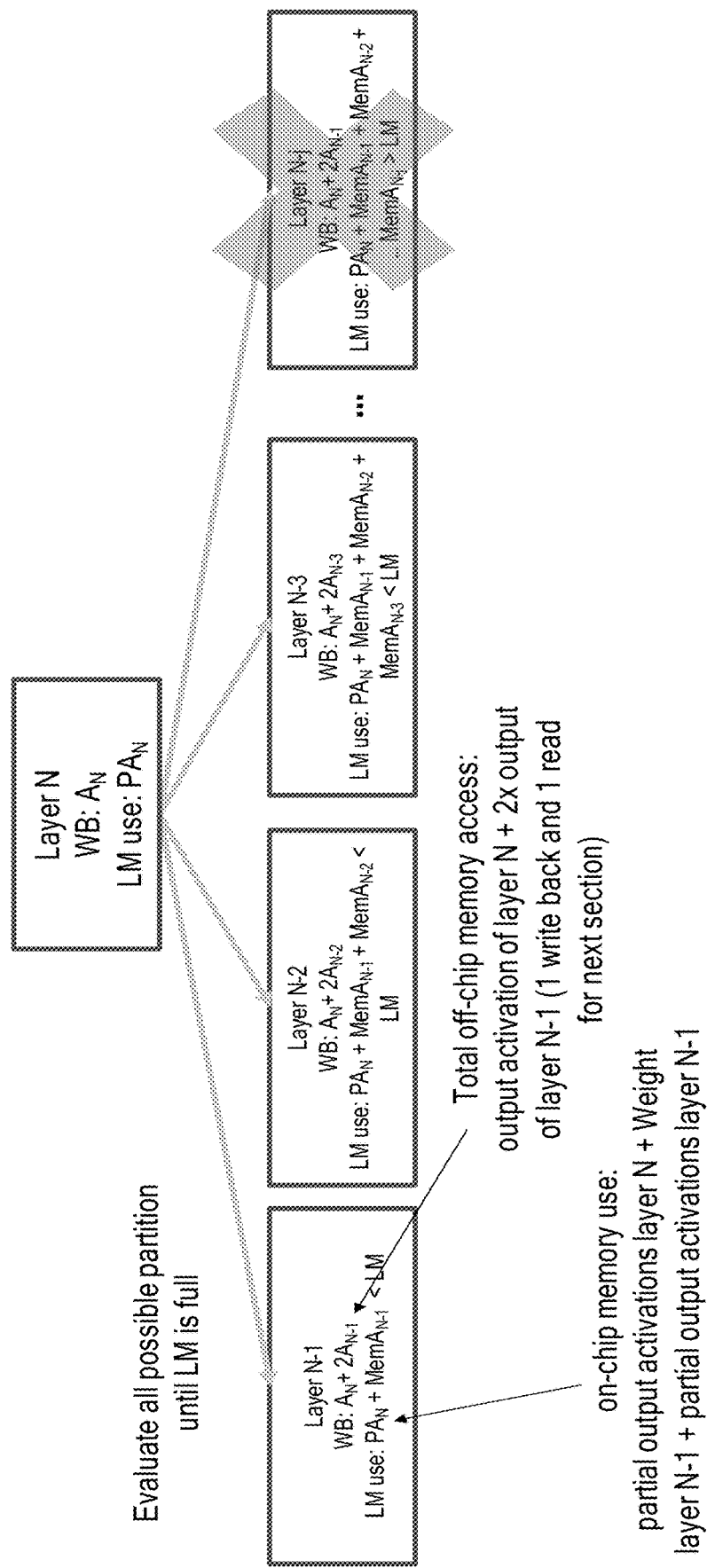
FIG. 6A is a block diagram illustrating an example of determining a cut-off layer for a partition in accordance with aspects of the present disclosure.

FIG. 6A is a block diagram illustrating an example of determining a cut-off layer for a partition according to aspects of the present disclosure. As shown in FIG. 6A, the method of determining the cut-off layer begins at a final layer N. According to aspects of the present disclosure, each layer generates activations (A). As described above, each layer may include multiple tiles (e.g., portions). The output of a tile may be referred to as a partial activation (PA). For the final layer N, the method determines a total off-chip memory write back (WB) for an output activation of layer N ($A_N$). The method also determines the on-chip memory (e.g., local memory (LM)) use for the partial output of the activations of layer N ($PA_N$). The partial output refers to the output of the tile of the layer (see elements 402A, 402B, 402C, FIG. 4).

The on-chip memory may store the partial output of the activations of one or more partitions (e.g., layer set). That is, a portion of an output tensor of a partition may be stored in on-chip memory to reduce an amount of data transferred between off-chip memory and on-chip memory. In one configuration, the method identifies tensors that may be stored in on-chip memory (e.g., partitions output of the activations). The method may also determine if the identified tensor fits in the available on-chip memory. For example, the method determines if a size of the tensor is less than an available on-chip memory. Additionally, or alternatively, the on-chip memory may store a portion of the machine learning model (e.g., artificial neural network).

After determining the on-chip value of the partial activations ($PA_N$) and off-chip values of the activations ($A_N$) for the final layer N, the method evaluates possible cut-off points until the on-chip memory is full. As shown in FIG. 6A, the method evaluates the on-chip memory use for each layer preceding the final layer N. For example, for layer N-1, the method determines if the on-chip memory use of the final layer N ($PA_N$) and the current layer N-1 ($MemA_{N-1}$) is less than the available on-chip memory. Specifically, the method determines if the sum of the partial output activations of layer N, the weights of layer N-1, and the partial output activations of layer N-1 are less than the available on-chip memory. If the sum is less than the available on-chip memory, the method moves to the next layer. The method may set the cut-off point at the current layer N-1 if the sum is equal to the available on-chip memory.

For each layer, the method also determines the total off-chip memory access. In the example of FIG. 6A, the total off-chip memory access (e.g., read to and write from off-chip memory) is referred to as a write back (WB). For example, for layer N-1, the method determines a sum of the output activations of layer N ($A_N$) and the output of layer N-1 ($2A_{N-1}$). Layer N-1 would perform one write back operation and one read operation. That is, layer N-1 reads the output of layer N-2. Thus, two instances of off-chip memory access (e.g., $2A_{N-1}$) may be determined for layer N-1.

As shown in FIG. 6A, the process continues until the calculated on-chip memory use of a current layer and all preceding layers is greater than the available on-chip memory. In FIG. 6A, the on-chip memory use for layer N-j is greater than the available on-chip memory (e.g., $PA_N$+$MemA_{N-1}$+$MemA_{N-2}$+ . . . $MemA_{N-j}$>LM). Accordingly, the system determines that the cut-off should occur between layer N-j and layer N-j+1 (e.g., before layer N-j+1). After determining the cut-off layer, the method repeats the search for the remaining layers (N-1 to N-j+1) to determine if one or more partitions should occur before layer N-j+1.

Figure 6B:
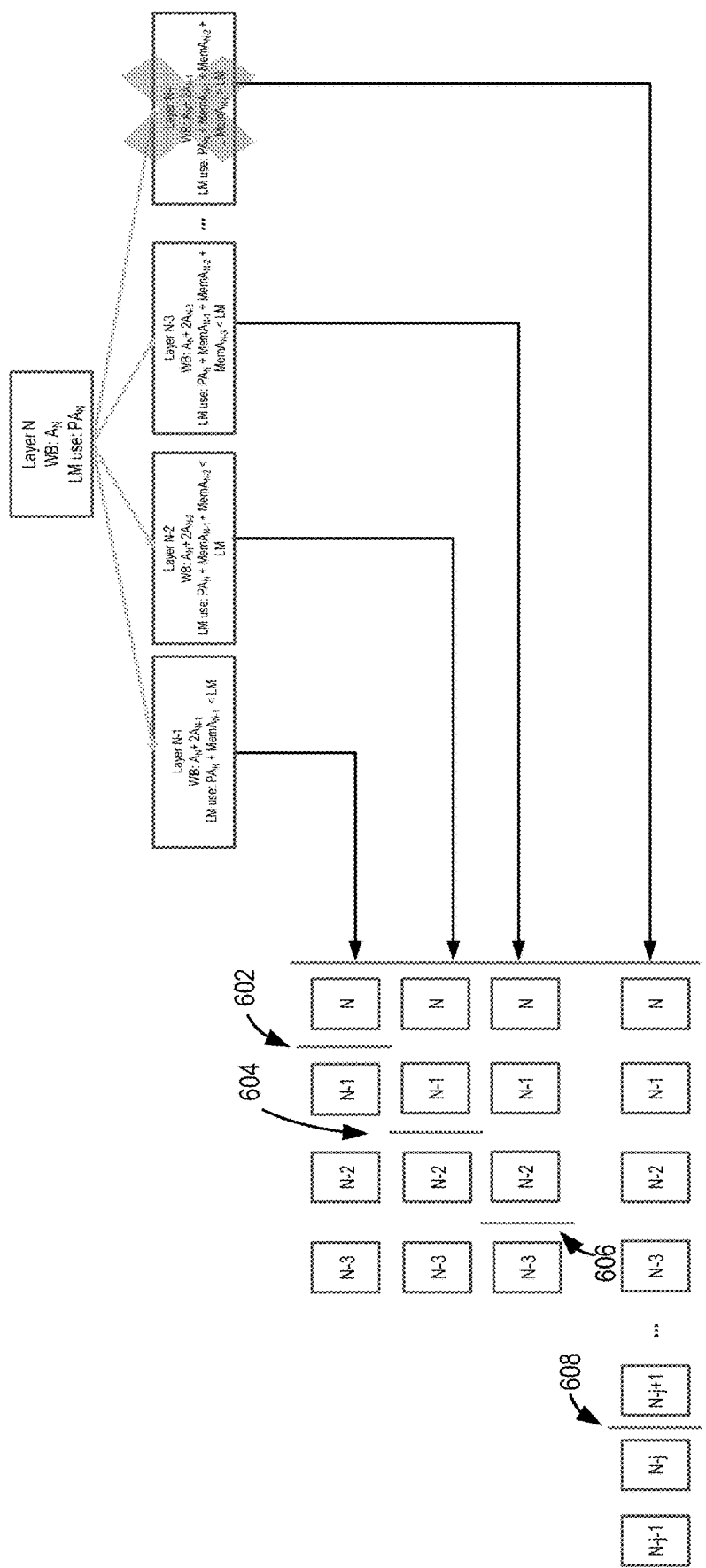
FIG. 6B is a block diagram illustrating an example of partition points in accordance with aspects of the present disclosure.

In FIG. 6A, each branch represents a partition point between a current layer and a subsequent layer. FIG. 6B is a block diagram illustrating an example of partition points according to aspects of the present disclosure. The example of FIG. 6B is based on the tree graph of FIG. 6A. As shown in FIG. 6B, the branch from layer N to layer N-1 represents a partition 602 between layer N and layer N-1, where layer N and layer N-1 are in different layer sets, and layer N-1 may be the current layer and layer N is the subsequent layer.

As another example, the branch from layer N to layer N-2 represents a partition 604 between layer N-2 and layer N-1, where layers N and layer N-1 are in one layer set and layer N-2 is in a different layer set. As yet another example, the branch from layer N to layer N-3 represents a partition 606 between layer N-2 and layer N-3, where layers N, N-1, and N-2 are in one layer set and layer N-3 is in a different layer set. As still yet another example, a branch from layer N to layer N-j represents a partition 608 between layer N-j and N-j+1, where layers N to layer N-j+1 are in one layer set and layer N-j is in a different layer set.

Aspects of the present disclosure are not limited to the method of searching for a cut-off point as described with respect to FIGS. 6A and 6B. Other search functions may be contemplated. For example, a space search may avoid testing a same set of nodes with different permutations (e.g., exploration without permutations). In this example, if a first partition includes nodes {1, 2, 3}, the method may skip the evaluation of node 2 for addition to a second partition if the second partition includes nodes 1 and 3. In another example, a linear ordering heuristic may be specified to limit a search space. In this example, branches may be ranked and searched based on rank order.

Figure 7A:
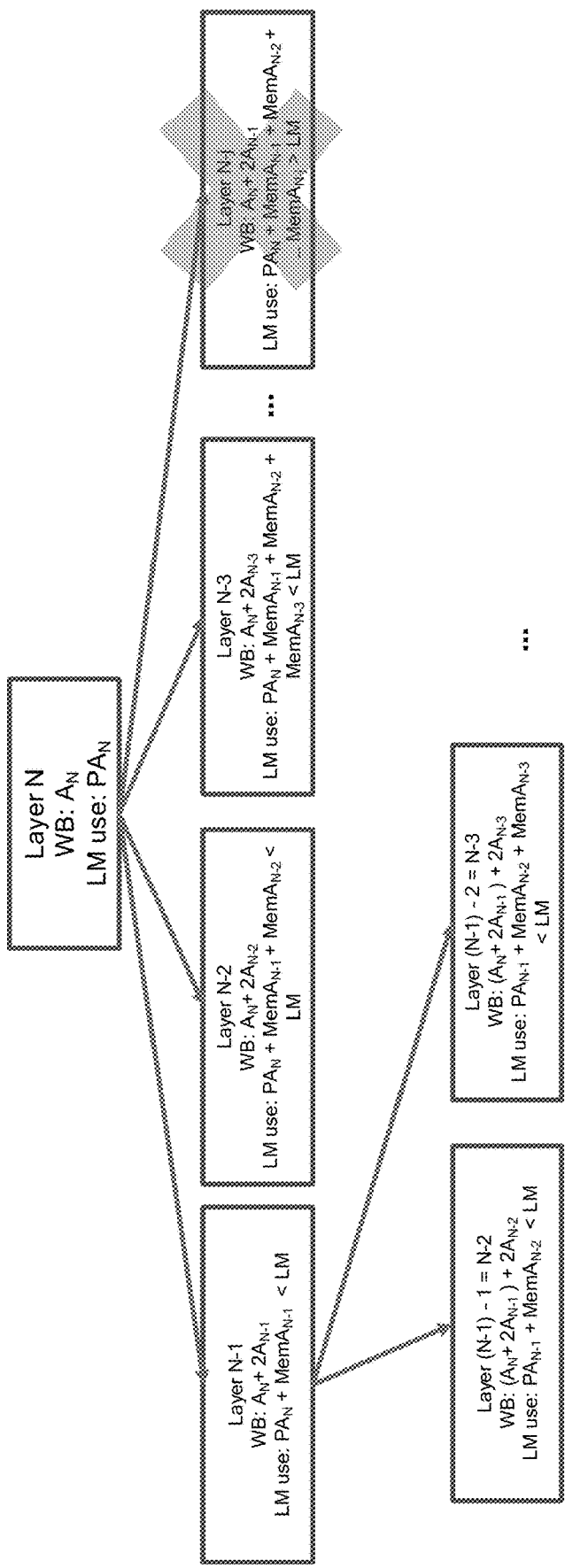
FIGS. 7A and 7B are block diagrams illustrating examples of determining a cut-off layer for a partition in accordance with aspects of the present disclosure.

As discussed, after determining a cut-off point from an initial node (e.g., layer N), the method repeats the search for the remaining layers (e.g., layers N-1 to N-j+1) to determine if one or more partitions should occur between two of the remaining layers. FIG. 7A is a block diagram illustrating an example of evaluating the remaining layers to determine if one or more partitions should occur at a location that is different from a location of the initial partition. As shown in FIG. 7A, for each layer from N-1 to N-j+1, the method evaluates the on-chip and off-chip memory use for branching from layers N-1 to N-j+1. For simplicity, only layers N-2 ((N-1)-1) and N-3 ((N-1)-2) are shown in FIG. 7A.

In one configuration, the method determines the on-chip memory use (LM) and off-chip memory use (WB) for layers N-2 ((N-1)-1) and N-3 ((N-1)-2) based on a partition before layer N-1 and another partition before a layer branching from the layer N-1 node (e.g., layer N-2 ((N-1)-1) or layer N-3 ((N-1)-2). In this example, because another cut-off would be placed at a node branching from the layer N-1 node, an additional write back operation and read operation would be performed at the next partition. Therefore, as shown in FIG. 7A, the method considers the off-chip memory use for the current partition ($A_N$+$2A_{N-1}$) and the off-chip memory use of the new partition ($2A_{N-2}$).

Figure 7B:
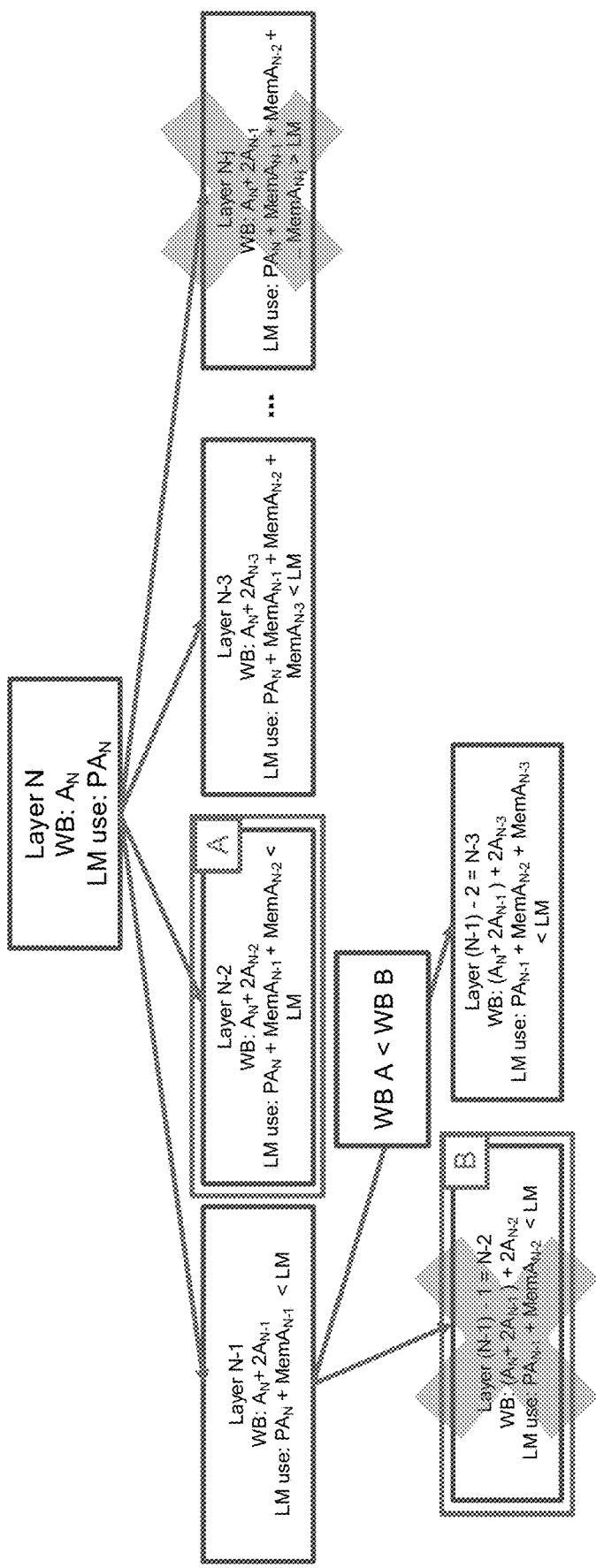

After determining the on-chip and off-chip memory use for layers N-2 ((N-1)-1) and N-3 ((N-1)-2) based on a partition between layer N and layer N-1 and another partition between layer N-1 and layer N-2 or a partition between layer N-2 and layer N-3, the method compares the off-chip memory use of identical layers. FIG. 7B is a block diagram illustrating an example of comparing identical layers according to aspects of the present disclosure. As shown in FIG. 7B, the method compares the off-chip memory use of layer N-2 in scenario A (WB A) based on a partition between layer N-1 and layer N-2 to the off-chip memory use of layer N-2 in scenario B (WB B) based on a partition between layer N and layer N-1 and a partition between layer N-1 and layer N-2.

In this example, the off-chip memory use of layer N-2 in scenario B (WB B) is greater than the off-chip memory use of layer N-2 in scenario A (WB A). Therefore, the method prunes layer N-2 in scenario B (WB B). Pruning refers to disregarding a partition between both layer N and layer N-1 and between layer N-1 and layer N-2 in subsequent searches. The pruning improves a speed of a search function.

Figure 7C:
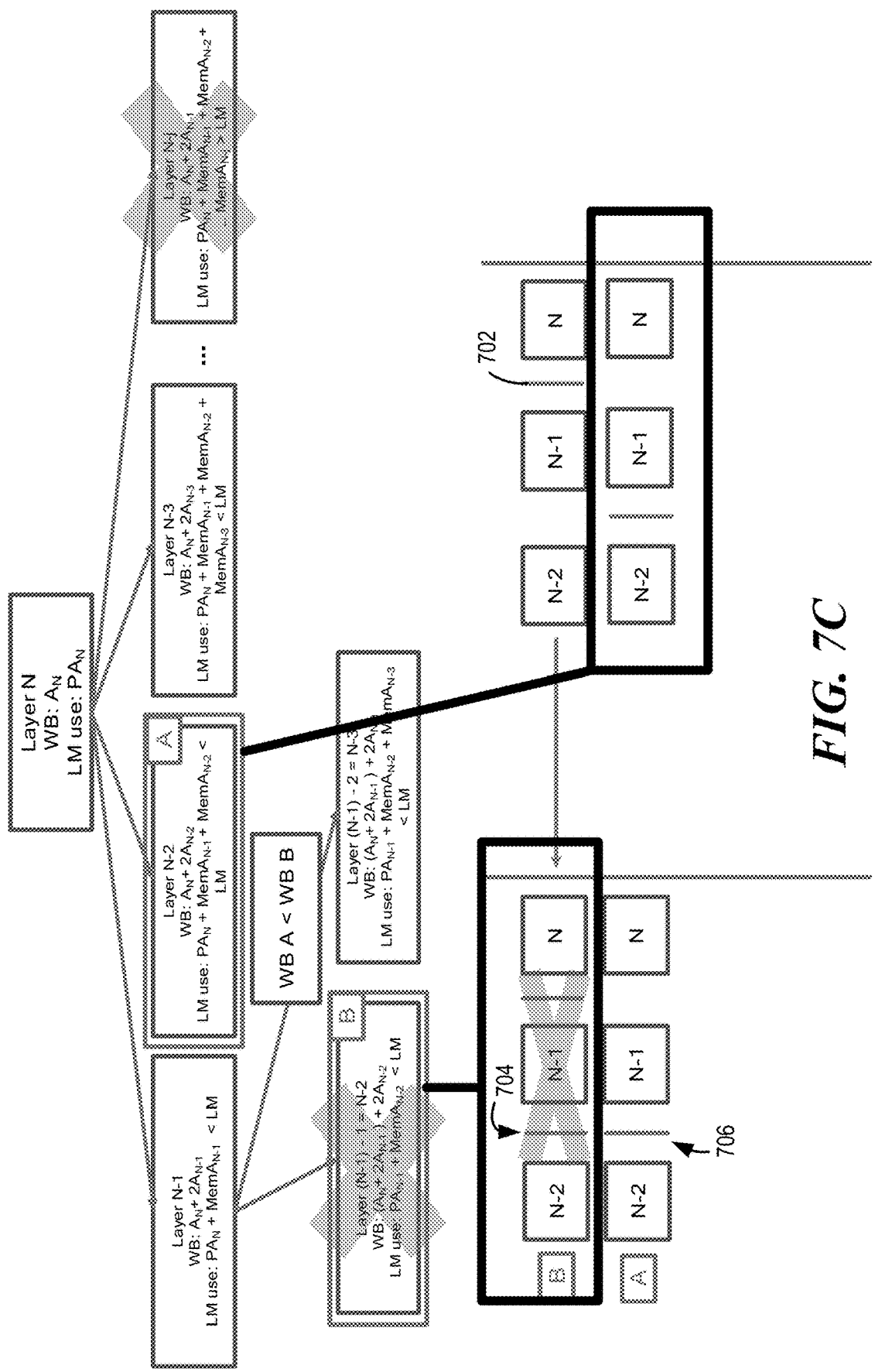
FIG. 7C is a block diagram illustrating an example of partition points in accordance with aspects of the present disclosure.

Similar to FIG. 6A, each branch of FIGS. 7A and 7B represents a different partition point. FIG. 7C is a block diagram illustrating an example of partition points according to aspects of the present disclosure. The example of FIG. 7C is based on the tree graph of FIG. 7B. As shown in FIG. 7C, the branch from layer N to layer N-1 represents a partition 702 between layer N and layer N-1. Subsequently, a branch from layer N-1 to layer N-2((N-1)-1) represents a partition 704 between layer N-1 and layer N-2, such that there is one partition 702 between layer N and layer N-1 and another partition 704 between layer N-1 and layer N-2, where layers N, N-1, and N-2 are in different layer sets.

Additionally, as shown in FIG. 7C, a branch from layer N to layer N-2 represents a partition 706 between layer N-1 and layer N-2. In one configuration, the method compares the off-chip memory use for layer N-2 in the two different partition scenarios (e.g., A and B). As discussed, the off-chip memory use for scenario A (WB A) is less than the off-chip memory use for scenario B (WB B). Therefore, scenario B is parsed.

Figure 7D:
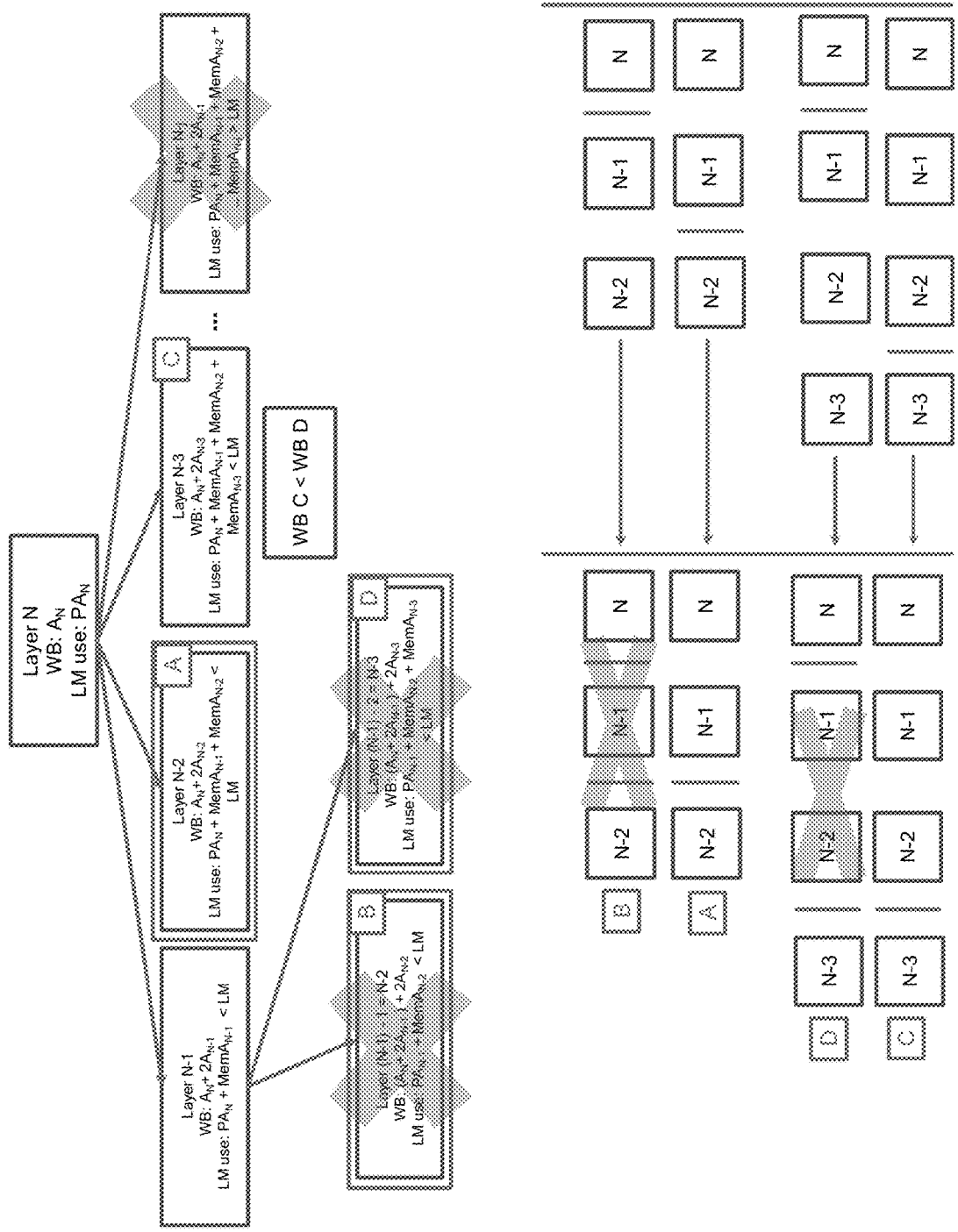
FIG. 7D is a diagram illustrating an example of determining a cut-off layer for a partition in accordance with aspects of the present disclosure.

After comparing layer N-2 partitions (e.g., scenarios A and B), the method compares layer N-3 partitions (e.g., scenarios C and D). FIG. 7D is a block diagram illustrating an example of comparing the off-chip memory use for different partition points according to aspects of the present disclosure. As shown in FIG. 7D, the method compares the off-chip memory use of layer N-3 for scenario D (WB D) to the on-chip memory use of layer N-3 for scenario C (WB C). In scenario D, the partition is placed between layer N and layer N-1 and also between layer N-2 and layer N-3. In scenario C, the partition is placed between layer N-2 and layer N-3.

In the current example, the off-chip memory use of layer N-3 for scenario D (WB D) is greater than the off-chip memory use of layer N-3 for scenario C (WB C). Therefore, the scenario with a partition between both layer N-2 and layer N-3 and a partition between layer N and layer N-1 is pruned from the search.

Figure 8:
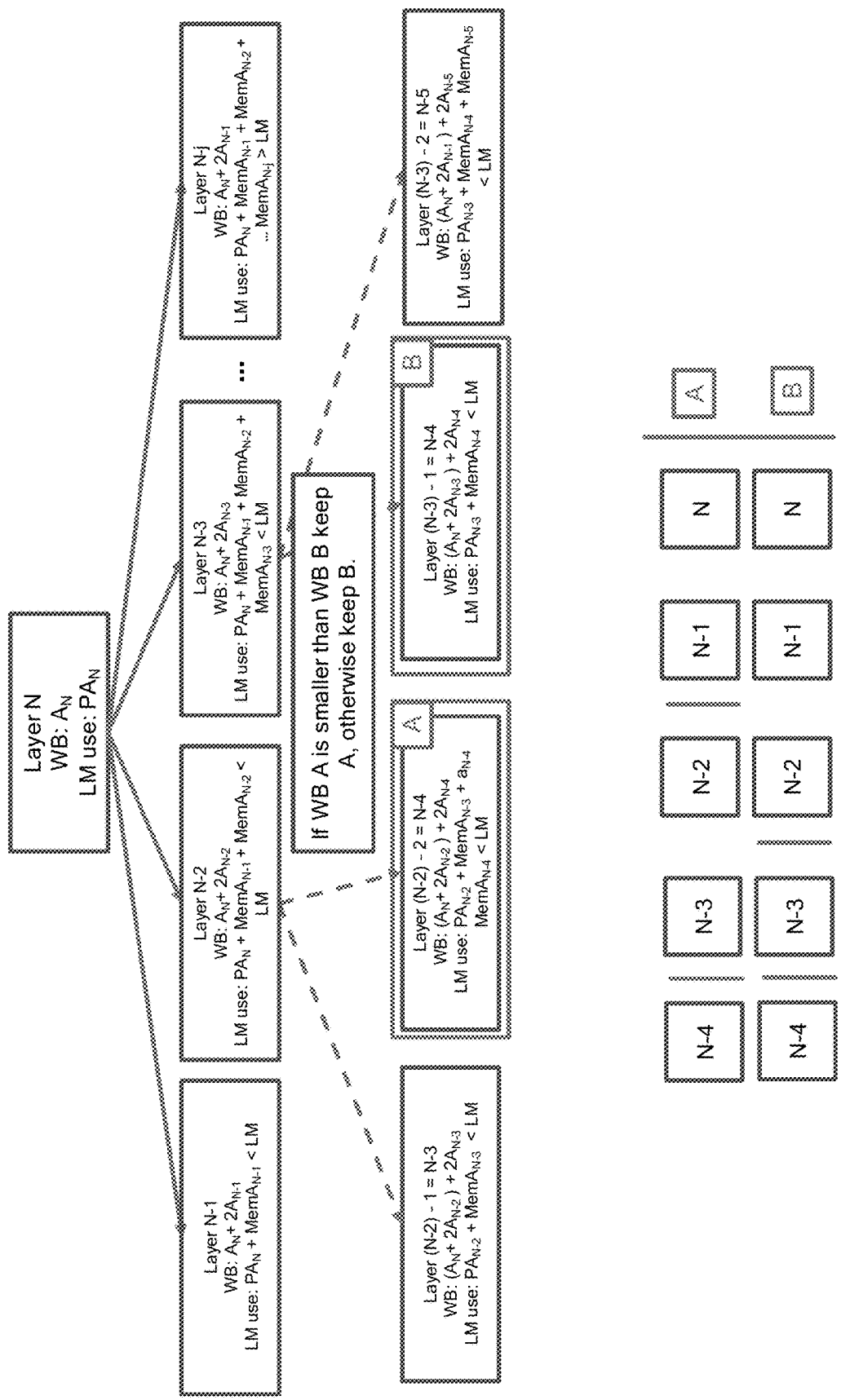
FIG. 8 is a block diagram illustrating an example of determining a cut-off layer for a partition in accordance with aspects of the present disclosure.

The method iterates the pruning and searching step until all possible partitions have been covered. The iterations compare identical partition points for different scenarios. FIG. 8 is a block diagram illustrating another example of comparing partition points according to aspects of the present disclosure. As shown in FIG. 8, the method compares the off-chip memory use of layer N-4 for scenario A (WB A) to the off-chip memory use of layer N-4 for scenario B (WB B).

In scenario A, the partitions would be placed between layer N-1 and layer N-2 and also between layer N-3 and layer N-4. In scenario B, the partitions would be placed between layer N-2 and layer N-3 and also between layer N-3 and layer N-4. In this example, if WB A is less than WB B, the partition in scenario B is pruned. Otherwise, the partition in scenario A is pruned.

Based on a location of a partition, adjacent layers of a DCN are fused into multiple sections. In one configuration, the method determines the amount of on-chip memory needed to add a layer to a section. Dynamic programming may be used to find the partitions between sections without an exhaustive evaluation of all possible partitions. Each section may be referred to as a layer set or a processing cone.

The method loads a portion of the input activations of the first layer of a section to the on-chip memory. The method processes the portion of input activations, stores partial results to the on-chip memory, and writes back the output of the last layer of a section to off-chip memory. Unused partial activations between adjacent layers within a section may be discarded.

Figure 9:
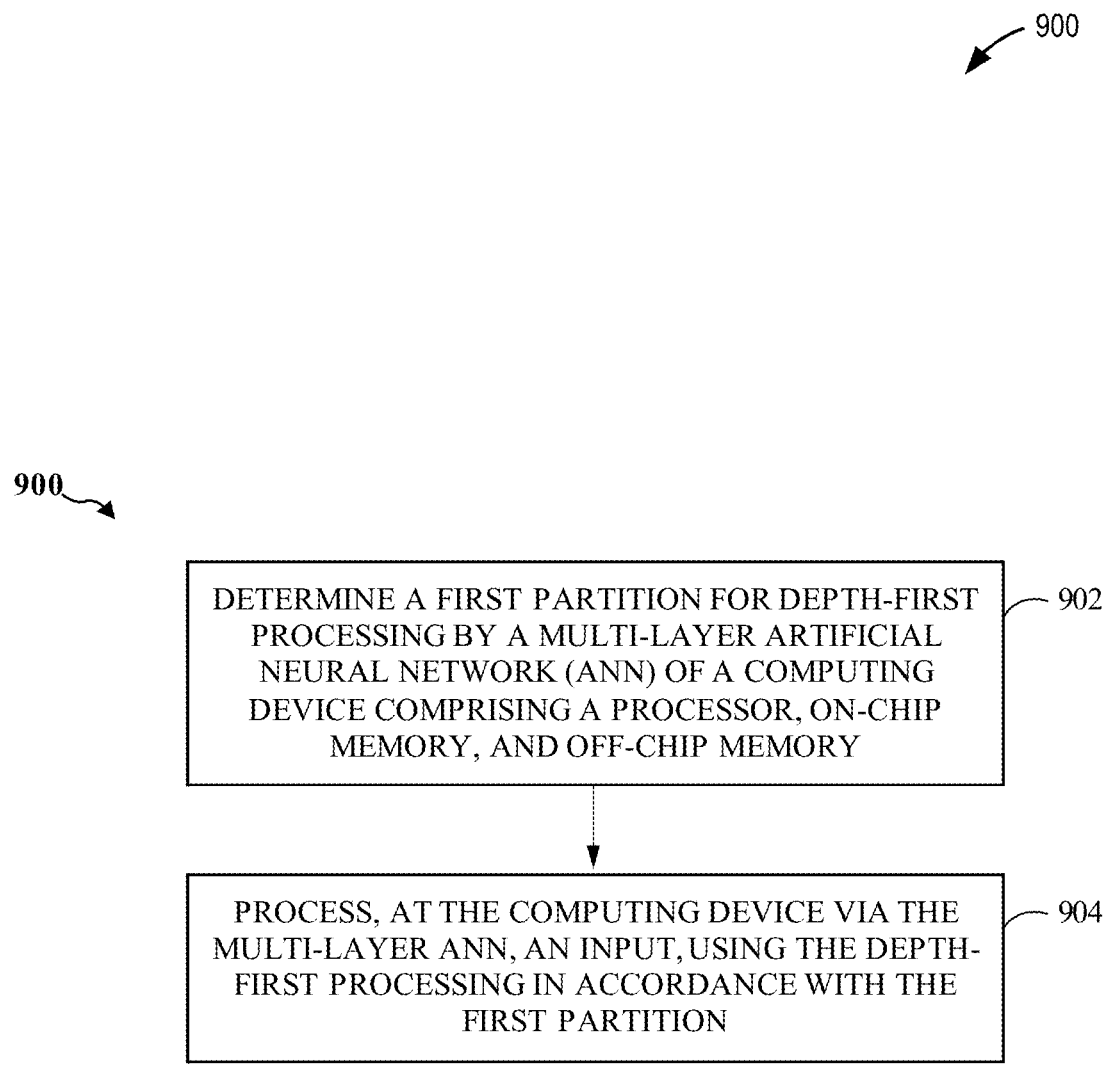
FIG. 9 is a flow diagram illustrating an example of a method performed by an artificial neural network in accordance with aspects of the present disclosure.

FIG. 9 illustrates a flow diagram for a method 900 according to an aspect of the present disclosure. The method may be performed by a computing device, such as a computing device implementing the SOC 100, according to aspects of the present disclosure. The computing device may include a processor, on-chip memory, and off-chip memory. The processor may be the SOC 100 as described with reference to FIG. 1. As shown in FIG. 9, at block 902, the computing device determines a first partition for depth-first processing by a multi-layer artificial neural network (ANN).

In one configuration, the first partition includes a set of layers. A number of layers in the set of layers may be less than a number of layers in the multi-layer ANN. The first partition may be determined based on an amount of on-chip memory used by the first partition, an available amount of on-chip memory, and a size of a write back to the off-chip memory. The first partition may be determined in accordance with the processes described with reference to FIGS. 6A, 6B, 7A, 7B, 7C, 7D, and 8. At block 904, the computing device processes, via the multi-layer ANN, an input, using the depth-first processing in accordance with the first partition. In one configuration, the ANN is implemented (e.g., executed on the computing device). In another configuration, the computing device determines the partition and ANN is implemented on a different computing device.

In one configuration, the amount of on-chip memory used by the first partition is determined based on a sum of on-chip memory use for partial output activations of each layer of the set of layers and on-chip memory use for weights of each layer in the first partition. For example, as described with respect to FIG. 6A, the method evaluates the on-chip memory use for each layer preceding the final layer N. For example, for layer N-1, the method determines if the on-chip memory use of the final layer N ($PA_N$) and the current layer N-1 ($MemA_{N-1}$) is less than the available on-chip memory. Specifically, the method determines if the sum of the partial output activations of layer N, the weights of layer N-1, and the partial output activations of layer N-1 are less than the available on-chip memory.

In one configuration, an device identifies potential partition locations between multiple layers of a neural network based on an amount of on-chip memory and an amount of on-chip memory use of the multiple layers. The amount of on-chip memory use of the layers may be determined from a sum of memory used for partial output activations of a final layer that performs a write back, memory use for weights of each layer in the layers preceding the final layer, and memory use for partial output activations of each layer in layers preceding the final layer. The amount of the on-chip memory use of the layers is less than the amount of on-chip memory.

In one configuration, processing the input includes loading a portion of input activations of a first layer of a processing cone to the on-chip memory. Specifically, the portion of the input activations is processed with subsequent layers of the processing cone. Partial results of the processing are stored with the subsequent layers to the on-chip memory and an output of the processing cone is written to off-chip memory. The portions of the input may be processed by each processing cone of a partition as described with reference to FIG. 4.

Implementation examples are described in the following numbers clauses:

1. A method performed by a computing device, comprising:
   determining a first partition for depth-first processing by a multi-layer artificial neural network (ANN) of the computing device comprising a processor, on-chip memory, and off-chip memory, the first partition determined based on an amount of on-chip memory used by the first partition, an available amount of on-chip memory, and a size of a write back to the off-chip memory; and
   processing, at the device via the multi-layer ANN, an input, using the depth-first processing in accordance with the first partition.

2. The method of clause 1, further comprising determining the amount of on-chip memory used by the first layer partition based on a sum of an amount of on-chip memory used for partial output activations of each layer of the first partition and an amount of on-chip memory used for weights of each layer of the first partition.
3. The method of any of clauses 1-2, in which the amount of on-chip memory used by the first layer partition is less than a total amount of on-chip memory.
4. The method of any of clauses 1-3, further comprising:
   recursively searching for new partition locations after determining the first partition; and
   pruning a potential partition location based on a size of a write back to the off-chip memory by the potential partition location.
5. The method of clause 4, further comprising determining a second partition for the depth-first processing by the multi-layer ANN, in which layers of the second partition are different from layers of the first partition.
6. The method of any of clauses 1-5, further comprising generating a plurality of processing cones for the first partition, each processing cone processing a different portion of the input.
7. The method of clause 6, in which processing the input comprises loading a portion of input activations of an initial layer of the first partition to the on-chip memory, the portion corresponding to a processing cone of the plurality of processing cones.
8. The method of clause 7, in which processing the input by the first processing cone further comprises:
   processing the portion of the input activations with activations of portions of subsequent layers of the first partition;
   storing partial results of the processing to the on-chip memory; and
   writing an output of the processing cone to the off-chip memory.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method performed by a computing device comprising a processor, on-chip memory, and off-chip memory, the method comprising:

determining a first partition for depth-first processing by a multi-layer artificial neural network (ANN) of the computing device, the first partition comprising a set of consecutive layers of the ANN, the first partition determined based on an amount of on-chip memory used by the first partition, an available amount of on-chip memory, and a size of data corresponding to a write back of intermediate activations to the off-chip memory, the amount of on-chip memory used by the first partition corresponding to a sum of a first amount of on-chip memory used for respective partial output of each layer of the first partition and a second amount of on-chip memory used for respective weights of each layer of the first partition, each partial output comprising a tile of one or more output activations generated in response to a corresponding portion of input activations received at a respective layer of the first partition, the tile being a spatial or channel-wise subset of total output activations associated with the respective layer; and processing, at the computing device via the multi-layer ANN, an input, using the depth-first processing in accordance with the first partition, the depth-first processing comprising processing each tile associated with a respective portion of input activations through the set of consecutive layers of the first partition before processing a subsequent portion of input activations.

2. The method of claim 1, in which the amount of on-chip memory used by the first partition is less than a total amount of on-chip memory.

3. The method of claim 1, further comprising:
recursively searching for new partition locations after determining the first partition; and
pruning a potential partition location based on a size of a write back to the off-chip memory by the potential partition location.

4. The method of claim 3, further comprising determining a second partition for the depth-first processing by the multi-layer ANN, in which layers of the second partition are different from layers of the first partition.

5. The method of claim 1, further comprising generating a plurality of processing cones for the first partition, each processing cone processing a different portion of the input.

6. The method of claim 5, in which processing the input comprises loading a portion of input activations of an initial layer of the first partition to the on-chip memory, the portion corresponding to a processing cone of the plurality of processing cones.

7. The method of claim 6, in which processing the input further comprises:
processing the portion of the input activations with activations of portions of subsequent layers of the first partition;
storing partial results of the processing to the on-chip memory; and
writing an output of the processing cone to the off-chip memory.

8. An apparatus, comprising:
at least one processor comprising on-chip memory;
off-chip memory coupled with the at least one processor; and
instructions stored in the off-chip memory and the on-chip memory, the instructions operable, when executed by the at least one processor, to cause the apparatus:
to determine a first partition for depth-first processing by a multi-layer artificial neural network (ANN) of the apparatus, the first partition comprising a set of consecutive layers of the ANN, the first partition determined based on an amount of on-chip memory used by the first partition, an available amount of on-chip memory, and a size of data corresponding to a write back of intermediate activations to the off-chip memory, the amount of on-chip memory used by the first partition corresponding to a sum of a first amount of on-chip memory used for respective partial output of each layer of the first partition and a second amount of on-chip memory used for respective weights of each layer of the first partition, each partial output comprising a tile of one or more output activations generated in response to a corresponding portion of an input activations received at a respective layer of the first partition, the tile being a spatial or channel-wise subset of total output activations activations associated with the respective layer; and
to process, via the multi-layer ANN, an input, using the depth-first processing in accordance with the first partition, the depth-first processing comprising processing each tile associated with a respective portion of input activations through the set of consecutive layers of the first partition before processing a subsequent portion of input activations.

9. The apparatus of claim 8, in which the amount of on-chip memory used by the first partition is less than a total amount of on-chip memory.

10. The apparatus of claim 8, in which the instructions are further operable to cause the apparatus:
to recursively search for new partition locations after determining the first partition; and
to prune a potential partition location based on a size of a write back to the off-chip memory by the potential partition location.

11. The apparatus of claim 10, in which the instructions are further operable to cause the apparatus to determine a second partition for the depth-first processing by the multi-layer ANN, in which layers of the second partition are different from layers of the first partition.

12. The apparatus of claim 8, in which the instructions are further operable to cause the apparatus to generate a plurality of processing cones for the first partition, each processing cone processing a different portion of the input.

13. The apparatus of claim 12, in which the instructions are further operable to cause the apparatus to process the input by loading a portion of input activations of an initial layer of the first partition to the on-chip memory, the portion corresponding to a processing cone of the plurality of processing cones.

14. The apparatus of claim 13, in which the instructions are further operable to cause the apparatus to process the input by:
processing the portion of the input activations with activations of portions of subsequent layers of the first partition;
storing partial results of the processing to the on-chip memory; and
writing an output of the processing cone to the off-chip memory.

15. A non-transitory computer-readable medium having program code recorded thereon for a computing device comprising at least one processor, on-chip memory, and off-chip memory, the program code executed by the at least one processor and comprising:
program code to determine a first partition for depth-first processing by a multi-layer artificial neural network (ANN) of the computing device, the first partition comprising a set of consecutive layers of the ANN, the first partition determined based on an amount of on-chip memory used by the first partition, an available amount of on-chip memory, and a size of data corresponding to a write back of intermediate activations to the off-chip memory, the amount of on-chip memory used by the first partition corresponding to a sum of a first amount of on-chip memory used for respective partial output of each layer of the first partition and a second amount of on-chip memory used for respective weights of each layer of the first partition, each partial output comprising a tile of one or more output activations generated in response to a corresponding portion of an input activations received at a respective layer of the first partition, the tile being a spatial or channel-wise subset of total output activations associated with the respective layer; and program code to process, via the multi-layer ANN, an input, using the depth-first processing in accordance with the first partition, the depth-first processing comprising processing each tile associated with a respective portion of input activations through the set of consecutive layers of the first partition before processing a subsequent portion of input activations.

16. The non-transitory computer-readable medium of claim 15, in which the amount of on-chip memory used by the first partition is less than a total amount of on-chip memory.

17. The non-transitory computer-readable medium of claim 15, in which the program code further comprises:
program code to recursively search for new partition locations after determining the first partition; and
program code to prune a potential partition location based on a size of a write back to the off-chip memory by the potential partition location.

18. The non-transitory computer-readable medium of claim 17, in which the program code further comprises program code to determine a second partition for the depth-first processing by the multi-layer ANN, in which layers of the second partition are different from layers of the first partition.

19. The non-transitory computer-readable medium of claim 15, in which the program code further comprises program code to generate a plurality of processing cones for the first partition, each processing cone processing a different portion of the input.

20. The non-transitory computer-readable medium of claim 19, in which the program code to process the input further comprises program code to load a portion of input activations of an initial layer of the first partition to the on-chip memory, the portion corresponding to a processing cone of the plurality of processing cones.

21. The non-transitory computer-readable medium of claim 20, in which the program code to process the input further comprises:

program code to process the portion of the input activations with activations of portions of subsequent layers of the first partition;
program code to store partial results of the processing to the on-chip memory; and
program code to write an output of the processing cone to the off-chip memory.

22. An apparatus of a computing device comprising on-chip memory and off-chip memory, the apparatus comprising:
means for determining a first partition for depth-first processing by a multi-layer artificial neural network (ANN), the first partition comprising a set of consecutive layers of the ANN, the first partition determined based on an amount of on-chip memory used by the first partition, an available amount of on-chip memory, and a size of data corresponding to a write back of intermediate activations to the off-chip memory, the amount of on-chip memory used by the first partition corresponding to a sum of a first amount of on-chip memory used for respective partial output of each layer of the first partition and a second amount of on-chip memory used for respective weights of each layer of the first partition, each partial output comprising a tile of one or more output activations generated in response to a corresponding portion of an input activations received at a respective layer of the first partition, the tile being a spatial or channel-wise subset of total output activations associated with the respective layer; and
means for processing, via the multi-layer ANN, an input, using the depth-first processing in accordance with the first partition, the depth-first processing comprising processing each tile associated with a respective portion of input activations through the set of consecutive layers of the first partition before processing a subsequent portion of input activations.

23. The apparatus of claim 22, in which the amount of on-chip memory used by the first partition is less than a total amount of on-chip memory.

24. The apparatus of claim 22, further comprising:
means for recursively searching for new partition locations after determining the first partition; and
means for pruning a potential partition location based on a size of a write back to the off-chip memory by the potential partition location.

25. The apparatus of claim 24, further comprising means for determining a second partition for the depth-first processing by the multi-layer ANN, in which layers of the second partition are different from layers of the first partition.

26. The apparatus of claim 22, further comprising means for generating a plurality of processing cones for the first partition, each processing cone processing a different portion of the input.

* * * * *